Feb. 1, 1966     C. E. BATES     3,233,130
SEALED BRUSH CHAMBER FOR AN ALTERNATOR
Filed June 28, 1963     2 Sheets-Sheet 1
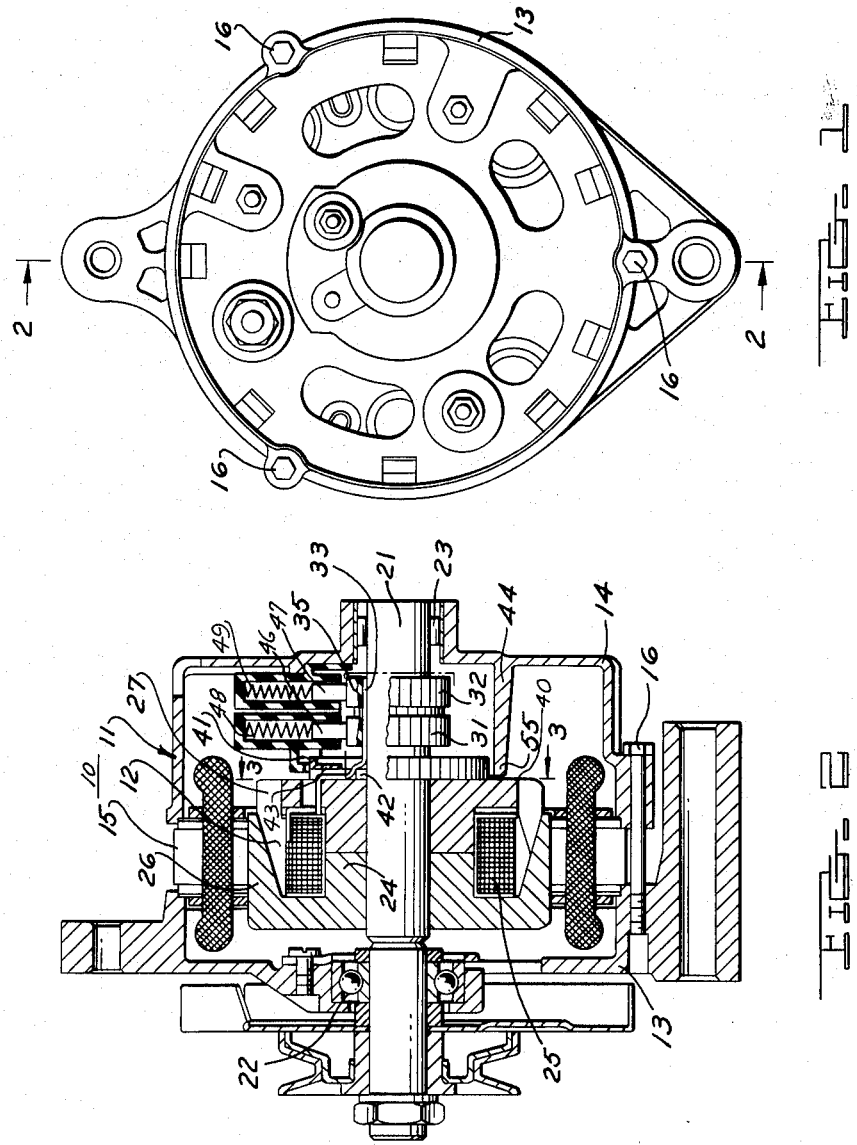
CHARLES E. BATES
INVENTOR.
BY John R. Faulkner
Keith L. Zerschling
ATTORNEYS

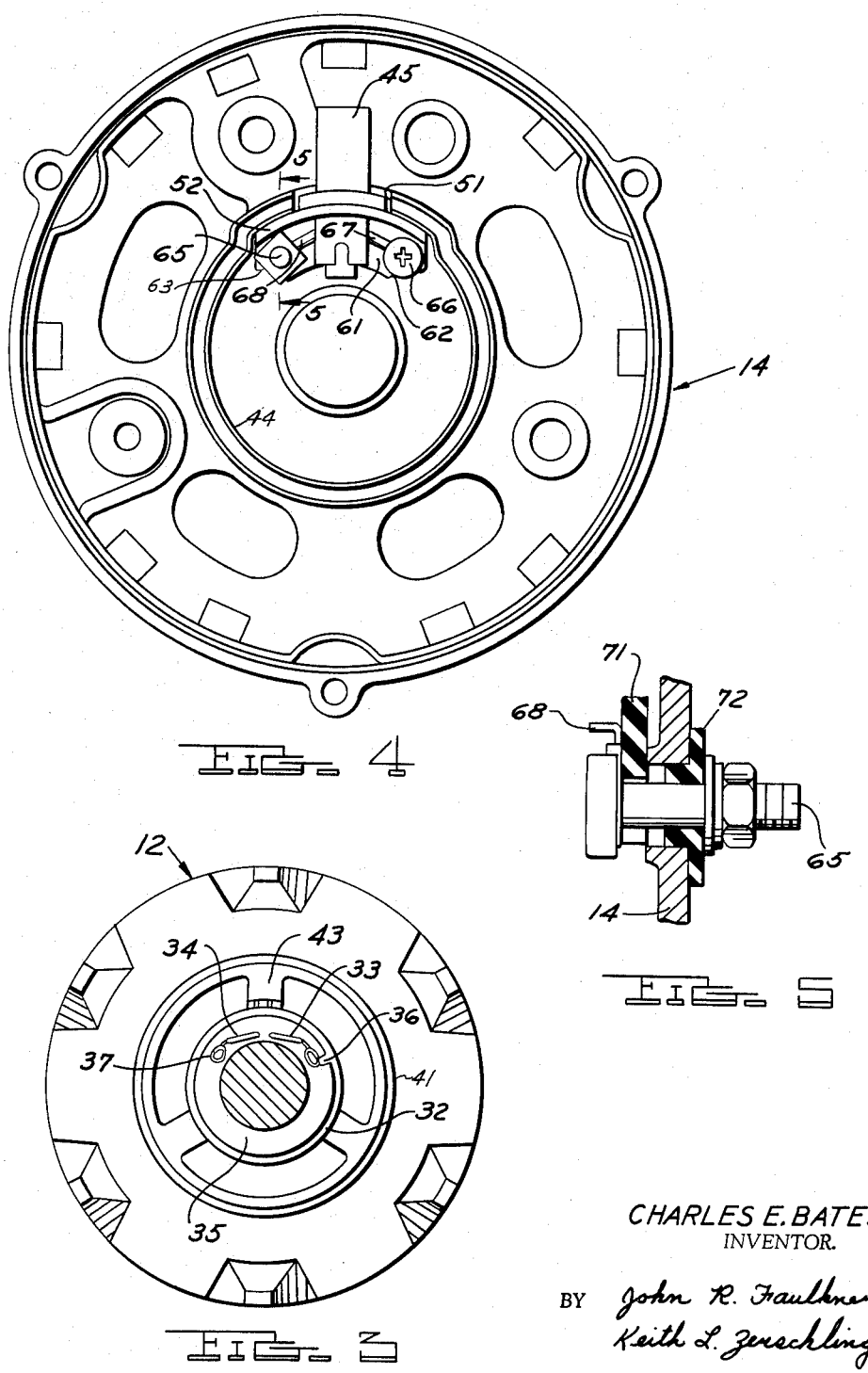

United States Patent Office 3,233,130
Patented Feb. 1, 1966

3,233,130
SEALED BRUSH CHAMBER FOR
AN ALTERNATOR
Charles E. Bates, Dearborn, Mich., assignor to The Ford
Motor Company, Dearborn, Mich., a corporation of
Delaware
Filed June 28, 1963, Ser. No. 291,437
6 Claims. (Cl. 310—88)

This invention relates to a dynamoelectric machine and more particularly to a means for providing a sealed enclosure for the electrical contact brushes and the current collector member carried by the rotor of the machine.

In dynamoelectric machines it is necessary for efficient and maintenance free operation to provide a means for shielding the electrical contact brushes and the current collector member mounted on the rotor from dirt and other contaminants. It is often desirable also to shield this structure from the external atmosphere when an explosive atmosphere may be present. The present invention accomplishes these purposes by providing an enclosure for the current collector members and the electrical contact brushes. A rotary seal of the labyrinth type between the rotor and a portion of the stator completes the enclosure. The brush holder that supports the electrical contact brushes forms a portion of the enclosure and a portion of the rotary seal.

In the preferred embodiment of the invention, an annular shoulder is formed on the rotor of the machine. A cylindrical end bell is formed on the stator of the machine that encloses the current collector members mounted on the rotor. This cylindrical end bell extends over the annular shoulder on the rotor in close proximity thereto. A very close rotary seal is formed between the cylindrical end bell and the annular shoulder on the rotor. The brush holder that supports the electrical contact brushes forms a portion or arcuate segment of the cylindrical end bell and it has an arcuate portion that forms a section of the rotary seal in cooperation with the annular shoulder on the rotor.

This structure forms an efficient and inexpensive sealed enclosure for the electrical contact brushes and current collector member of the dynamoelectric machine. It is particularly advantageous in alternators designed for use in automotive vehicles. This type of alternator is produced on a volume basis and small incremental cost savings are of the utmost importance. The seal provided in the invention is admirably suited for the automotive alternator because of its relative simplicity and low cost.

An object of the invention is the provision of a simple and inexpensive sealed enclosure for the electrical contact brushes and current collector members of a dynamoelectric machine.

Another object of the invention is the provision of a sealed enclosure for the electrical contact brushes and current collector members of a dynamoelectric machine that utilize existing parts and necessary parts of the machine to form the seal.

A further object of the invention is the provision of a sealed enclosure for the electrical contact brushes and current collector members of an alternator that is particularly suited for use in automotive vehicles.

Other objects and attendant advantages of the invention will become more apparent as the specification is considered in connection with the attached drawings in which:

FIGURE 1 is an end view of the dynamoelectric machine of the invention;

FIGURE 2 is a sectional view taken along the lines 2—2 of FIGURE 1;

FIGURE 3 is an end view of the rotor of the dynamoelectric machine;

FIGURE 4 is an elevational view of the rear housing of the dynamoelectric machine stator; and FIGURE 5 is a sectional view taken along the lines 5—5 of FIGURE 4.

Referring now to the drawings in which like reference numerals designate like parts throughout the several views thereof, there is shown in FIGURES 1 and 2 a dynamoelectric machine 10 that preferably takes the form of an alternator. The dynamoelectric machine or alternator is comprised of a stator 11 and a rotor 12. The stator 11 is formed of a front housing member 13, a rear housing member 14 and an armature winding assembly 15. The front housing member 13, rear housing member 14, and armature winding assembly 15 are fastened together by a plurality of bolts 16.

The rotor 12 includes a shaft 21 that is rotatably supported in the stator 11 by means of a ball bearing 22 in the front housing member 13 and a roller bearing 23 in the rear housing member 14. The rotor shaft 21 carries a standard field structure 24 comprised of a field winding 25 and magnetic pole pieces 26 and 27. The rotor shaft also carries current collector members 31 and 32 that in the alternator take the form of slip rings. The current collector member 32 is connected to one end of the field winding 25 by means of a lead 33 while the other current collector member 31 is connected to the other end of the field winding by means of a lead 34. The current collector members 31 and 32 are made of an electrical conductive material and are mounted on the rotor shaft 21 by means of an insulating collar 35. As shown in FIGURE 3, the lead 33 is connected to the current collector member 32 by means of a tab 36, while the lead 34 is connected to a tab 37 that extends through the insulating collar 35 into engagement with current collector member 31.

An annular shoulder or shield 41 is carried by the rotor shaft 21 and is positioned between the field structure 24 and the current collector members 31 and 32. This annular shoulder or shield is supported on the rotor shaft 21 by a central hub 42 affixed to the shaft and a plurality of radially extending arms 43. The leads 33 and 34 from the field winding 25 extend through one of the arms 43, as can be seen by reference to FIGURES 2 and 3. The annular shoulder or shield abuts the end wall 40 of magnetic pole piece 27.

The stator 11 has a cylindrical axially extending end bell 44. This end bell preferably takes the form of an annular flange that has a diameter substantially greater than the diameter of the current collector members 31 and 32 and that extends in a direction axially with respect to the axis of the rotor shaft 21. A portion of the end bell 44 is formed integrally with the rear housing 14. The remainder of the end bell 44 is formed by means of a brush holder 45 that carries electrical contact brushes 46 and 47. These electrical contact brushes 46 and 47 are biased into engagement with current collector members 31 and 32 respectively by means of springs 48 and 49.

As can best be seen by reference to FIGURES 2 and 4, the portion of the end bell 44 that is formed integrally with the rear housing 14 does not form a complete annulus. A slot 51 is positioned in this portion of the end bell. Also, on either side of this slot 51 the inner diameter of the portion of the end bell formed integrally with the rear housing member 14 is increased. The slot 51 is occupied by the brush holder 45. The brush holder 45 has an arcuate portion or segment 52 that has the same inner diameter as the portion of the end bell formed integrally with the rear housing 14. This arcuate portion or segment 52 has an outer diameter substantially the same as the inner diameter of that portion of the end bell formed integrally with the rear housing member 14 and positioned on either side of the slot 51. The brush holder 45 including the arcuate segment 52, therefore, completes the end bell 44.

The end portion of the end bell 44 positioned adjacent the annular shoulder 41 on the rotor 12 has an inner diameter just slightly greater than the outer diameter of the annular shoulder 41 and it is positioned over the annular shoulder 41. For example, there may be .0025" clearance between the end portion 55 of the end bell 44 and the annular shoulder 41. This provides a rotary seal between these two members that is in the form of a single labyrinth seal. The end portion of the end bell 55 that forms this rotary seal with the annular shoulder 41 includes the arcuate segment 52 of the brush holder 45.

The seal thus formed completely encloses the current collector members 31 and 32 and the brushes 46 and 47 within the end bell structure 44. This enclosed structure with its seal prevents dirt and other contaminants from interfering with the transfer of electrical energy between the current collector members 31 and 32 and the electrical brushes 46 and 47. The sealed structure also provides a means for preventing explosions that might otherwise be caused by any electrical arcing that might take place between the brushes and the current collector members in any type of explosive atmosphere.

Referring now to FIGURES 4 and 5, the electrical brush holder 45 has an arcuate depending flange 61. This arcuate depending flange has a pair of slots 62 and 63 positioned therein for the reception of bolts 65 and 66 that bolt the electrical brush holder 45 to the rear housing assembly 14. The bolt 66 is connected to electrical brush 46 by means of lead 67 and is grounded to the rear housing member 14. The other bolt 65 is connected to electrical brush 47 by means of lead 68. The bolt 65 is electrically insulated from the rear housing 14 by means of an insulator 71 positioned on the inner wall of the rear housing 14 and another insulator 72 positioned on the outer wall of the rear housing 14. The bolt 65 can thus receive a lead from an external circuit that provides proper energization of the field winding 25.

The present invention thus provides an efficient, effective and inexpensive sealed structure for the current collector members and electrical contact brushes of a dynamoelectric machine. This seal will prevent dirt and contaminants from interfering with the transfer of electrical energy between the brushes and the current collector members and will also provide a means for preventing explosions if the dynamoelectric machine is operated in an explosive atmosphere.

It will be understood that the invention is not to be limited to the exact construction shown and described, but that various changes and modifications may be made without departing from the spirit and scope of the invention as defined in the appended claims.

I claim:

1. In a dynamoelectric machine, a stator, a rotor including a shaft rotatably mounted within said stator, an electrical winding mounted upon said shaft, a current collector member carried by said shaft positioned adjacent one end of said rotor, said current collector member being connected to said electrical winding, said stator having a cylindrical end bell enclosing said current collector member and forming a rotary seal with said rotor, a brush holder forming a portion of said cylindrical end bell and having an arcuate segment forming a portion of said rotary seal, an electrical contact brush, said brush holder supporting said electrical contact brush in engagement with said current collector member.

2. In a dynamoelectric machine, a stator, a rotor including a shaft rotatably mounted within said stator, an electrical winding mounted upon said shaft, a current collector member carried by said shaft positioned adjacent one end of said rotor, said current collector member being electrically connected to said electrical winding, said stator having an end bell enclosing said current collector member and forming a rotary seal with said rotor, a brush holder forming a portion of said end bell and said rotary seal, an electrical contact brush, said brush holder supporting said electrical contact brush in contact with said current collector member.

3. In a dynamoelectric machine, a stator, a rotor including a shaft rotatably mounted within said stator, an electrical winding mounted on said shaft, a current collector member connected to said electrical winding carried by said shaft adjacent one end of said shaft, said rotor having an annular shoulder extending in an axial direction of said shaft toward said current collector member, said stator having an annular flange extending towards an annular shoulder and enclosing said current collector member, said annular flange having a portion extending over said annular shoulder in a close fit relationship to form a rotary seal with said annular shoulder, a brush holder extending through said annular flange, an electrical contact brush, said brush holder supporting said electrical contact brush in contact with said current collector member.

4. In a dynamoelectric machine stator, a rotor including a shaft rotatably mounted within said stator, an electrical winding mounted upon said shaft, a current collector member connected to said electrical winding and carried by said shaft adjacent one end of said shaft, an annular shoulder carried by said rotor and extending in an axial direction of the rotor toward said current collector member, said stator having an annular flange extending axially of said shaft over said current collector member and over said annular shoulder, the inner diameter of said annular flange and the outer diameter of said annular shoulder being dimensioned to form a rotary seal between said annular shoulder and said annular flange, a brush holder, an electrical contact brush supported by said brush holder in electrical contact with said current collector member, said brush holder forming a portion of said annular flange and having an arcuate segment forming a portion of said annular flange that extends over said annular shoulder and forms said rotary seal.

5. In an alternator, a stator, a rotor including a shaft rotatably mounted within said stator, a field structure including a field winding mounted upon said shaft, a pair of slip rings carried by said shaft connected to said field winding and positioned adjacent one end of said shaft, said field structure having an annular shoulder extending in an axial direction of said shaft toward said slip rings, said stator having an annular flange extending toward said annular shoulder and enclosing said slip rings, said annular flange having a portion extending over said annular shoulder in a close fit relationship to form a rotary seal with said annular shoulder, a brush holder forming a portion of said annular flange, an electrical contact brush, said brush holder supporting said electrical contact brushes in contact with said slip rings.

6. In an alternator, a stator, a rotor including a shaft rotatably mounted within said stator, a field structure including a field winding mounted upon said shaft, a pair of slip rings connected to said field winding and carried by said shaft positioned adjacent one end of said shaft, said field structure having an annular shoulder extending in an axial direction toward said slip rings, said stator having an annular flange extending axially of said shaft over said slip rings and over said annular shoulder, the outer diameter of said shoulder and the inner diameter of said annular shoulder being dimensioned to form a rotary seal between the inner surface of said annular flange and the outer surface of said annular shoulder, a brush holder, electrical contact brushes supported by said brush holder in electrical contact with said slip rings, said brush holder supported by said stator and having an arcuate segment forming a portion of said annular flange that is positioned over said annular shoulder.

No references cited.

ORIS L. RADER, *Primary Examiner.*